Jan. 23, 1923.

W. LITTLEY.
DIGGING DEVICE.
FILED DEC. 27, 1921.

1,443,138.

Witnesses
Frederic C. Whitney
Augustus B. Coppes

Inventor
William Littley
by Joshua R. H. Toth
his Attorney

Patented Jan. 23, 1923.

1,443,138

UNITED STATES PATENT OFFICE.

WILLIAM LITTLEY, OF PHILADELPHIA, PENNSYLVANIA.

DIGGING DEVICE.

Application filed December 27, 1921. Serial No. 525,021.

*To all whom it may concern:*

Be it known that I, WILLIAM LITTLEY, a citizen of the United States, residing at Philadelphia, in the county of Philadelphia and State of Pennsylvania, have invented certain new and useful Improvements in Digging Devices, of which the following is a specification.

One object of my invention is to provide an improved device which may be conveniently and easily used for digging holes, such for example as post holes; the device being so constructed that it can be easily manufactured.

Another object is to make my improved device of a strong and durable construction.

These objects, and other advantageous ends which will be described hereinafter, I attain in the following manner, reference being had to the accompanying drawings in which—

Figure 4:
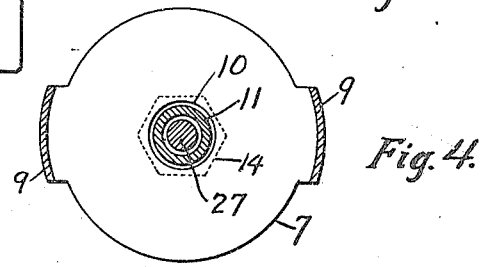
Figure 4 is a section taken on the line 4—4 of Figure 1.
Figure 5:
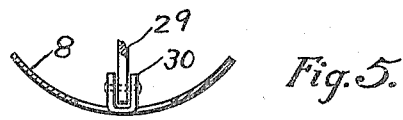
Figure 5 is a section taken on the line 5—5 of Figure 3.
Figure 3:
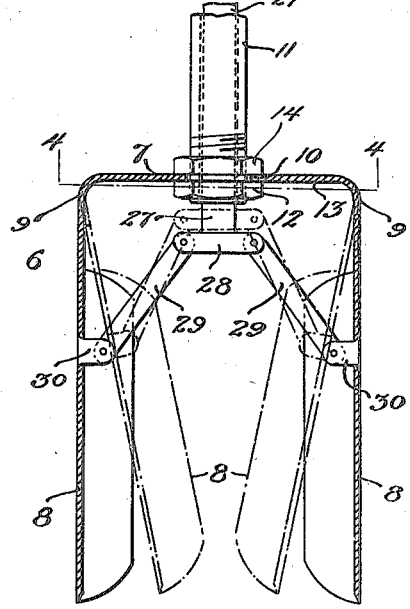
Figure 3 is a fragmentary side elevation of said device.

Referring to the drawings, 6 represents a digging head including a flat plate top portion 7 which has two integral jaws 8 depending therefrom. The plate top portion 7 and the jaws 8 are preferably made of sheet steel by stamping or cutting the same and then bending the jaws 8 downward from the top 7 with the jaws converging in the position shown in dot-and-dash lines in Figure 1, after which the head can be slightly tempered adjacent the curved portion 9 which provides the connection between the jaws and the top 7 so that if the jaws be afterwards spread apart the part 9 will be placed under tension and when the spreading power is released the jaws will automatically return to the converging position shown by said dot-and-dash lines in Figure 1. The parts including the portion 9 are preferably made comparatively narrow as shown in Figures 3 and 4 and are curved in cross section as shown in Figures 4 and 5.

The plate 7 has a hole 10 extending centrally therethrough and through this hole is projected the lower end of a tubular stem 11. Said tubular stem can be made of a length of pipe which is screw threaded at its lower portion and a nut 12 is screwed on said pipe and engages the under surface 13 of the top 7. A nut 14 is also screwed on the pipe 11 and engages the upper surface of the top 7. Thus the tubular stem is securely clamped to the digging head and projects upward therefrom and at its top is provided with a transversely extending handle 15; said handle having a sleeve portion 16 which is screwed on the upper end of the tubular stem 11. The handle 15 includes upwardly extending flanges 17 which are spaced apart. Above the top of the sleeve 16 a pivot pin 18 extends through the flanges and also through the cam portion 19 of an actuating lever 20. The cam portion 19 includes oppositely disposed parts 21 and 22 which represent the high portions of the cam and between these parts the cam has a portion 23 which represents the low portion of the cam and said low portion is in alignment with the length of the lever 20. The handle 15 includes hand hold portions 24 and 25 which connect with the sleeve portion 16 and these hand hold portions have beveled upper surfaces 26 which slant downward to the top of the sleeve portion as clearly shown in Figure 1. The pivot 18 is preferably directly over the axis of the tubular stem 11 for a purpose hereinafter made obvious.

An actuating bar 27 extends slidably through the tubular stem 11 and has its upper end in the space provided between the flanges 17 and by the beveled portions 26 of the handle. The lower end of the bar 27 projects below the lower end of the tubular stem 11 and has a transversely extending arm 28 preferably made integral therewith and to the opposite ends of this arm are pivotally connected links 29; said links at their lower ends are pivotally connected between ears 30 which are provided by punching portions of the digging jaws 8 inward as clearly shown in Figure 5.

Figure 1:
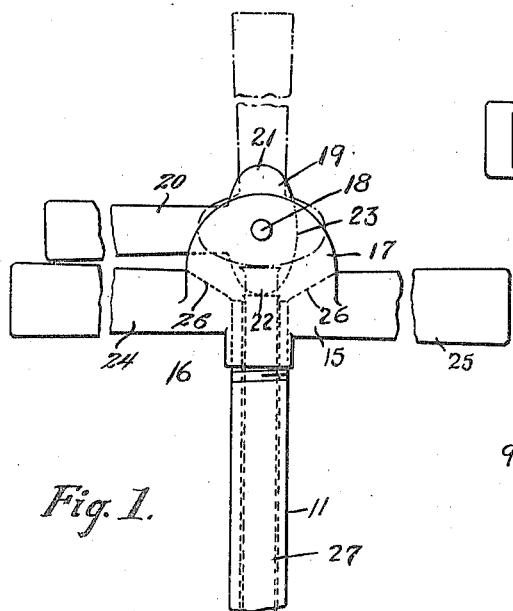
Figure 1 is an elevation partly in section illustrating my improved device.
Figure 2:
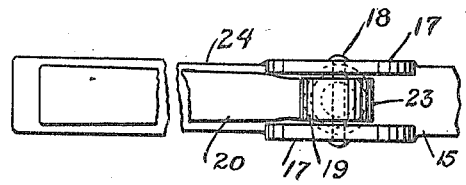
Figure 2 is a fragmentary top plan view showing the handle and lever construction.

When the hand lever 20 is moved into an upright position, as shown in dot-and-dash lines in Figure 1, the low portion 23 of the cam 19 will be directly over the top of the actuating bar 27 and the resilient property of the digging head will cause the jaws 8 to assume said converging position with the upper end of the bar 27 in the space between the beveled portions 26 of the handle and the flanges 17.

By swinging the lever 20 downward one of the high portions, either 21 or 22, is moved against the upper end of the actuating bar 27 and this action will move the bar 27 downward relatively to the tubular stem 11 and digging head 6 and during this action the links 29 will effect the spreading movement of the digging jaws 8 into the full line positions shown in Figure 1 and said jaws will be kept in said latter position as long as either of the high portions of the cams are in engagement with the top of the actuating bar 27.

With the jaws 8 in said latter position the workman by grasping the handle of the device can project the jaws into the ground and by turning on the handle with a twisting or auger movement will cause the jaws to cut into the ground and after having been inserted into the ground the lever 20 can be swung upward and the resilient characteristic of the digging head will cause the jaws to assume said converging position and compress the dirt or other material into which the device has been projected, and by a lifting movement of the device by the handle, the dirt thus wedged between the jaws can be lifted and in this manner holes can be readily dug.

By the above construction it is an easy matter to secure the tubular stem merely requiring the application of the nut 14 and then after the lower end of the tubular stem has been projected through the hole 10 in the top 7, to apply the nut 12. The bar 27 can then be inserted upwardly through the tubular stem and the links connected to the ears of the jaws 8 and to the arm 28. It will be noted that with the cam lever 20 arranged between the flanges 17 on the pivot pin 18, it is immaterial which direction the lever 20 is swung since it will be active when swung in either direction to effect the spreading of the jaws 8.

It will be noted that by adjusting the nuts 12 and 13 on the tubular stem 11 the position of the digging head can be changed relatively to the cam and consequently the spreading distance of the jaws can be varied by such adjustment so as to enable the digging of holes of different diameters.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A digging device including a digging head having a plate top and depending digging jaws; an upwardly projecting stem connected to said plate top; and means for moving said jaws relatively to each other; substantially as described.

2. A digging device including a digging head having a plate top with integral depending jaws normally converging in a direction away from said top, the portion of said digging head adjacent the junction of said jaws and top being resilient; and means for spreading said jaws whereby said portion will be placed under tension; substantially as described.

3. A digging device including a digging head having a top provided with a hole and depending jaws; a tubular stem having a screw threaded portion extending through said hole; nuts on said screw threaded portion for securing said tubular stem to said top; and means extending through said tubular stem and adapted to move said jaws relatively to each other; substantially as described.

4. A digging device including a digging head provided with jaws; a tubular stem connected to said digging head and having a handle adjacent its top, said handle having upwardly extending flanges spaced apart; an actuating bar extending through said tubular stem and operatively connected to said jaws, said actuating bar having a portion in alignment with the space between said flanges; and a lever having a cam portion pivoted between said flanges and operative upon said actuating bar to effect movement of said jaws; substantially as described.

5. A digging device including a digging head having a top and depending digging jaws; an upwardly projecting stem adjustably connected to said top; and means for moving said jaws relatively to each other; substantially as described.

In testimony whereof I have signed my name to this specification in the presence of two subscribing witnesses.

WILLIAM LITTLEY.

Witnesses:
 ELIZABETH GARBE,
 CHAS. E. POTTS.